(12) United States Patent
Kitsunai et al.

(10) Patent No.: US 8,241,769 B2
(45) Date of Patent: Aug. 14, 2012

(54) GLASS SUBSTRATE FOR A MAGNETIC DISK, MAGNETIC DISK AND METHOD OF MANUFACTURING A MAGNETIC DISK

(75) Inventors: Kouji Kitsunai, Shinjuku-ku (JP); Takashi Maeda, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/810,782

(22) PCT Filed: Dec. 24, 2008

(86) PCT No.: PCT/JP2008/073418
§ 371 (c)(1),
(2), (4) Date: Jun. 25, 2010

(87) PCT Pub. No.: WO2009/084534
PCT Pub. Date: Jul. 9, 2009

(65) Prior Publication Data
US 2010/0273030 A1 Oct. 28, 2010

(30) Foreign Application Priority Data

Dec. 28, 2007 (JP) ................. 2007-338966
Dec. 28, 2007 (JP) ................. 2007-338967

(51) Int. Cl.
*G11B 5/706* (2006.01)
*G11B 5/84* (2006.01)
*C23F 1/00* (2006.01)
*H05K 3/00* (2006.01)

(52) U.S. Cl. ............... 428/848.1; 428/848.2; 428/848.9; 360/135; 216/91; 65/64

(58) Field of Classification Search .................. 428/329, 428/848.8, 848.9, 846.9, 810, 848.1, 141, 428/800, 64.1, 64.2, 848.6; 360/135, 324.2; 216/91; 65/64, 111
See application file for complete search history.

(56) References Cited

U.S. PATENT DOCUMENTS

| 6,483,675 B1 * | 11/2002 | Araki et al. ................. 360/324.2 |
| 2002/0164505 A1 * | 11/2002 | Yokoyama et al. ......... 428/848.9 |
| 2003/0113512 A1 * | 6/2003 | Watanabe et al. ............. 428/141 |

(Continued)

FOREIGN PATENT DOCUMENTS

| JP | 2000-348330 A | 12/2000 |
| JP | 2004-265582 A | 9/2004 |
| JP | 2004-303281 A | 10/2004 |
| JP | 2005-141852 A | 6/2005 |
| JP | 2005-149668 A | 6/2005 |
| JP | 2006-268984 A | 10/2006 |
| WO | 2007/069501 A1 | 6/2007 |

*Primary Examiner* — Kevin M. Bernatz
*Assistant Examiner* — Louis Falasco
(74) *Attorney, Agent, or Firm* — Sughrue Mion, PLLC

(57) ABSTRACT

A glass substrate for a magnetic disk, wherein, in regions with respect to two places arbitrarily selected on a surface of the glass substrate on its central portion side relative to its outer peripheral end, a surface shape with a shape wavelength in a band of 60 to 500 μm is extracted from surface shapes in each of the regions and, assuming that a root mean square roughness Rq of the surface shape is given as a microwaviness Rq, the difference between the microwavinesses Rq of the regions is 0.02 nm or less or the difference between standard deviations of the microwavinesses Rq of the regions is 0.04 nm or less.

18 Claims, 12 Drawing Sheets

U.S. PATENT DOCUMENTS

| | | |
|---|---|---|
| 2003/0113585 A1* | 6/2003 | Mori et al. .................. 428/848.9 |
| 2003/0172677 A1 | 9/2003 | Miyamoto et al. |
| 2004/0192175 A1 | 9/2004 | Nakano et al. |
| 2004/0219353 A1* | 11/2004 | Harasawa et al. ............. 428/329 |
| 2006/0000809 A1* | 1/2006 | Matsumoto ..................... 216/91 |
| 2006/0194080 A1* | 8/2006 | Ishii et al. .................... 428/800 |
| 2006/0216551 A1 | 9/2006 | Tanifuji et al. |
| 2007/0003799 A1* | 1/2007 | Ogiwara et al. ........... 428/848.1 |
| 2008/0020238 A1* | 1/2008 | Tanaka et al. ................. 428/810 |
| 2008/0233330 A1* | 9/2008 | Ohashi ......................... 428/64.4 |
| 2009/0142626 A1* | 6/2009 | Orita et al. ................. 428/846.9 |
| 2009/0324995 A1* | 12/2009 | Todo et al. ................. 428/846.9 |

* cited by examiner

Relationship between MW-Rq (OD-MD) and Outer Peripheral TDH

Relationship between MW-Rq (OD-MD) and Outer Peripheral TDH

Relationship between MW-Rq STDEV(OD-MD) and Outer Peripheral TDH

Relationship between MW-Rq STDEV(OD-MD) and Outer Peripheral TDH

Relationship between Duboff and TDH
(no correlation observed)

Relationship between MW and TDH
(no correlation observed)

Relationship between MW-Rq (OD-MD) and
Outer Peripheral TDH
(Frequency Band: 500-1000 μm)

Relationship between MW-Rq (OD-MD) and
Outer Peripheral TDH
(Frequency Band: 500-1000 μm)

Relationship between MW-Rq STDEV (OD-MD)
and Outer Peripheral TDH
(Frequency Band: 500-1000 μm)

Relationship between MW-Rq STDEV (OD-MD)
and Outer Peripheral TDH
(Frequency Band: 500-1000 μm)

Relationship between MW-Rq (OD-MD) and
Outer Peripheral TDH
(Frequency Band: 10-60 μm)

Relationship between MW-Rq (OD-MD) and
Outer Peripheral TDH
(Frequency Band: 10-60 μm)

Relationship between MW-Rq STDEV (OD-MD) and Outer Peripheral TDH (Frequency Band: 10-60 μm)

Relationship between MW-Rq STDEV (OD-MD) and Outer Peripheral TDH (Frequency Band: 10-60 μm)

GLASS SUBSTRATE FOR A MAGNETIC DISK, MAGNETIC DISK AND METHOD OF MANUFACTURING A MAGNETIC DISK

TECHNICAL FIELD

This invention relates to a glass substrate for a magnetic disk that enables high-density recording and reproduction, to the magnetic disk, and to a method of manufacturing the magnetic disk.

BACKGROUND ART

As one of information recording media adapted to be mounted in information storage devices, there is known a magnetic disk adapted to be mounted in a hard disk (HDD). In recent years, it is strongly required to improve the recording capacity of the magnetic disk and thus it is of urgent necessity to increase the recording density thereof and to extend the recording area thereof.

As a factor for enabling high-density recording, it is necessary to reduce as much as possible the flying height of a magnetic head with respect to the magnetic disk and, for that purpose, it is necessary to make smoother a surface of the magnetic disk.

In order to extend the recording area, it is necessary to ensure as large as possible a smooth region of the main surface. However, depending on polishing conditions of a glass substrate, a surface-down in which a surface is lowered relative to a main surface of the glass substrate or a surface-up (hereinafter referred to as a rise) relative to the main surface occurs at an outer peripheral end portion of the substrate. When the magnetic head flies over the magnetic disk having such a shape, the head may be inclined at the surface-down or rise portion to make its flight unstable, thus causing a crash. The surface-down or rise portion has been impeding the extension of the recording area.

In recent years, there have been actively developed a magnetic head attached with a pad for preventing adhesion of the magnetic head even if a magnetic disk is smooth and a LUL (Load/Unload) system that enables realization of a lower flying height. Normally, in the case of this LUL system, a surface of a magnetic disk is smooth and, while the magnetic disk is stopped, a magnetic head stands by on the outside of the magnetic disk and, after the magnetic disk starts rotation, the magnetic head moves from the outside of the disk and flies over the surface of the disk to perform recording/reproduction. Therefore, in general, a lower flight is achieved as compared with the CSS system. In the case of the LUL system, in order to ensure the flying stability of the magnetic head, it is necessary to control an outer peripheral end portion shape of a substrate more strictly than in the case of the CSS system. In the case of the LUL system, since the low flight of the head is enabled, higher-density recording is made possible as compared with the CSS system.

In view of this, in order to realize a low flight of a magnetic head in the LUL system, there is an invention that achieves a smoothness high enough for enabling high-density recording and specifies an outer peripheral end portion shape to a predetermined value (e.g. specifying a surface-down in which a surface is lowered relative to a main surface of a glass substrate, or the like) for enabling extension of a recording area to the periphery (JP-A-2004-265582 (Patent Document 1)).

Patent Document 1: JP-A-2004-265582

DISCLOSURE OF THE INVENTION

Problem to be Solved by the Invention

However, a problem has arisen that even if the outer peripheral end portion shape of the glass substrate is improved by high-precision polishing or the like, i.e. even if a surface-down in which a surface is lowered relative to the main surface of the glass substrate or a surface-up (rise) relative to the main surface is reduced, when the magnetic head flies over a magnetic disk having such a shape, the flight of the head becomes unstable so that the flying height of the magnetic head cannot be lowered. This will be explained in detail hereinbelow.

First, for example, as shown in FIG. 5, in the case of a glass substrate for a magnetic disk with a diameter of 65 mmφ (radius 32.5 mm), as an index of an outer peripheral end portion shape (an index representing the flatness of an outer peripheral end portion shape in the range of ±μm with respect to a main surface as a reference plane (zero)) of the glass substrate, use is made of a larger value of maximum distances b and c in positive and negative directions, respectively, within the range of a straight line connecting between two points, i.e. a point A at radius r=29.9 mm and a point B at radius r=31.5 mm from the center of the substrate, and this value is called (defined as) Duboff.

In the conventional case where Duboff was greater than 30 nm, it was possible to reduce the touch-down height (TDH) at an outer peripheral end portion position as Duboff was reduced. On the other hand, in the present case where Duboff was 30 nm or less, as a result of examining the relationship between Duboff and the touch-down height (TDH) at an outer peripheral end portion position (position at radius r 31.5 mm), no correlation was observed as shown in FIG. 15. That is, it was seen that even if the outer peripheral end portion shape of the glass substrate was improved, i.e. even if a surface-down in which a surface was lowered relative to the main surface of the glass substrate or a surface-up (rise) relative to the main surface was reduced, it was not possible to reduce the touch-down height (TDH) at its outer peripheral end portion position (variation in touch-down height largely appeared).

Next, in the conventional case where the average value of the microwaviness (MW-Rq) (definition and so on will be described later) over the entire surface of a substrate was greater than 4 Å, it was possible to reduce the touch-down height (TDH) at its outer peripheral end portion position by reducing the average value of the microwaviness (MW-Rq) over the entire surface of the substrate or by reducing the microwaviness (MW-Rq) at its outer peripheral end portion assuming that inner peripheral TDH<outer peripheral TDH. On the other hand, in the present case where the average value of the microwaviness (MW-Rq) over the entire surface of a substrate was 4 Å (0.4 nm) or less, as a result of examining the relationship between the microwaviness (MW-Rq) at its outer peripheral end portion position (position at radius r 31.5 mm) and the touch-down height (TDH) at its outer peripheral end portion position (position at radius r 31.5 mm), no correlation was observed as shown in FIG. 16. That is, it was seen that even if the microwaviness was improved (reduced) at the outer peripheral end portion of the glass substrate, it was not possible to reduce the touch-down height (TDH) at its outer peripheral end portion position (variation in touch-down height largely appeared).

It is an object of this invention to devise means for solving the above-mentioned problem.

Means for Solving the Problem

As a result of examining its cause, the present inventors have found that when two regions are arbitrarily selected on a surface of a glass substrate and unless the difference or ratio between microwavinesses (definition and so on will be described later) measured in the respective regions satisfies a certain predetermined relationship, it is not possible to realize a reduction in flying height of a magnetic head.

Specifically, for example, as shown in FIG. 7, the relationship between the difference (radial direction MW-Rq (OD-MD): measured in a wavelength band of 60 to 500 μm) between a microwaviness at an outer peripheral end portion (e.g. a position at radius r=31.5 mm±0.05 mm) and a microwaviness at a central portion (e.g. a position at radius r=25 mm±3 mm) and the touch-down height (TDH) was examined and, as a result, a strong correlation was observed. That is, it was seen that it was possible to reduce the touch-down height (TDH) at the outer peripheral end portion position by reducing the difference (radial direction MW-Rq (OD-MD)) between the microwaviness at the outer peripheral end portion and the microwaviness at the central portion.

Further, for example, as shown in FIG. 8, the relationship between the ratio (radial direction MW-Rq (OD/MD): measured in a wavelength band of 60 to 500 μm) between a microwaviness at an outer peripheral end portion (e.g. a position at radius r=31.5 mm±0.05 mm) and a microwaviness at a central portion (e.g. a position at radius r=25 mm±3 mm) and the touch-down height (TDH) was examined and, as a result, a strong correlation was observed. That is, it was seen that it was possible to reduce the touch-down height (TDH) at the outer peripheral end portion position by reducing (making approach 1) the ratio (radial direction MW-Rq (OD/MD)) between the microwaviness at the outer peripheral end portion and the microwaviness at the central portion.

Likewise, it was seen that, for example, a tendency (correlation) similar to the above was also observed in the case where two arbitrary points at different distances in the radial direction were set as measurement regions.

In this invention, the observation of the strong correlation means that it is possible to prevent large variation in touch-down height (TDH) as shown in FIGS. 15 and 16. In this invention, the observation of the strong correlation means that it is possible to surely reduce the touch-down height (TDH) at the outer peripheral end portion position to a predetermined value.

This invention will be explained using an image diagram. Conventionally, as shown at (1) in FIG. 2, the microwaviness at a central portion of a disk is small while the microwaviness at its outer peripheral end portion is relatively large. Herein, as described above, even if the microwaviness at the outer peripheral end portion is improved (reduced), it is not possible to reduce the touch-down height (TDH) at the outer peripheral end portion position.

On the other hand, the present inventors have found that, as shown at (2) in FIG. 2, even if the microwaviness at a central portion of a disk is relatively large, it is possible to reduce the touch-down height (TDH) over the entire surface of a substrate including its outer peripheral end portion position by providing a surface state where the difference or ratio between the microwaviness at the central portion and the microwaviness at the outer peripheral end portion is small.

As a result of further examining the above-mentioned cause, the present inventors have found that when two regions are arbitrarily selected on a surface of a glass substrate and unless the difference or ratio between standard deviations of microwaviness (definition and so on will be described later) measured in the respective regions satisfies a certain predetermined relationship, it is not possible to realize a reduction in flying height of a magnetic head.

Specifically, for example, as shown in FIG. 9, the relationship between the difference (circumferential direction MW-Rq STDEV (OD-MD): measured in a wavelength band of 60 to 500 μm) between a standard deviation of microwaviness at an outer peripheral end portion (e.g. a region along the circumferential direction at radius r=31.5 mm±0.05 mm) and a standard deviation of microwaviness at a central portion (e.g. a region along the circumferential direction at radius r=25 mm±3 mm) and the touch-down height (TDH) was examined and, as a result, a strong correlation was observed. That is, it was seen that it was possible to reduce the touch-down height (TDH) at the outer peripheral end portion position by reducing the difference (circumferential direction MW-Rq STDEV (OD-MD)) between the standard deviation of microwaviness in the region along the circumferential direction at the outer peripheral end portion and the standard deviation of microwaviness in the region along the circumferential direction at the central portion.

Further, for example, as shown in FIG. 10, the relationship between the ratio (circumferential direction MW-Rq STDEV (OD/MD): measured in a wavelength band of 60 to 500 μm) between a standard deviation of microwaviness at an outer peripheral end portion (e.g. a region along the circumferential direction at radius r=31.5 mm±0.05 mm) and a standard deviation of microwaviness at a central portion (e.g. a region along the circumferential direction at radius r=25 mm±3 mm) and the touch-down height (TDH) was examined and, as a result, a strong correlation was observed. That is, it was seen that it was possible to reduce the touch-down height (TDH) at the outer peripheral end portion position by reducing (making approach 1) the ratio (circumferential direction MW-Rq STDEV (OD/MD)) between the standard deviation of microwaviness in the region along the circumferential direction at the outer peripheral end portion and the standard deviation of microwaviness in the region along the circumferential direction at the central portion.

Likewise, it was seen that, for example, a tendency (correlation) similar to the above was also observed in the case where two arbitrary points at different distances in the radial direction were selected and, with respect to the selected two places, two regions each extending along the circumferential direction at the same radius were set as measurement regions.

In this invention, the observation of the strong correlation means that it is possible to prevent large variation in touch-down height (TDH) as shown in FIGS. 15 and 16. In this invention, the observation of the strong correlation means that it is possible to surely reduce the touch-down height (TDH) at the outer peripheral end portion position to a predetermined value.

This invention will be explained using an image diagram. Conventionally, as shown at (1) in FIG. 3, the standard deviation of microwaviness at a central portion of a disk is small while the standard deviation of microwaviness at its outer peripheral end portion is relatively large.

On the other hand, the present inventors have found that, as shown at (2) in FIG. 3, it is possible to reduce the touch-down height (TDH) over the entire surface of a substrate including its outer peripheral end portion position by providing a surface state where the difference or ratio between the standard deviations of microwaviness at its central portion and its outer peripheral end portion is small.

This invention has found that there is a close relationship on the relationship between the microwaviness on a surface of a substrate and the glide height (touch-down height (TDH)) and that, by setting the microwaviness in a predetermined relationship or in a predetermined range, it is possible to provide a glass substrate for a magnetic disk capable of achieving a desired glide height (touch-down height), the magnetic disk, and a method of manufacturing the magnetic disk.

This invention has the following configurations.

(Configuration 1)

A glass substrate for a magnetic disk, wherein, in regions with respect to two places arbitrarily selected on a surface of the glass substrate on a central portion side relative to an outer peripheral end, a surface shape with a shape wavelength in a band of 60 to 500 μm is extracted from surface shapes in each of the regions and, assuming that a root mean square roughness Rq of the surface shape is given as a microwaviness Rq, a difference between the microwavinesses Rq of the regions is 0.02 nm or less.

(Configuration 2)

A glass substrate for a magnetic disk, wherein, in regions with respect to two places arbitrarily selected on a surface of the glass substrate on a central portion side relative to an outer peripheral end, a surface shape with a shape wavelength in a band of 60 to 500 μm is extracted from surface shapes in each of the regions and, assuming that a root mean square roughness Rq of the surface shape is given as a microwaviness Rq, a ratio between the microwavinesses Rq of the regions is 1.1 or less.

(Configuration 3)

A glass substrate for a magnetic disk according to Configuration 1 or 2, wherein the two places are an outer peripheral end portion of the disk and a central portion of a recording/reproducing area of the disk.

(Configuration 4)

A glass substrate for a magnetic disk according to Configuration 3, wherein the outer peripheral end portion of the disk is a point located 1.0 mm inward from an outer peripheral end of the disk toward a center of the disk or a region located inward of the point.

(Configuration 5)

A glass substrate for a magnetic disk according to Configuration 1 or 2, wherein the regions are two regions each extending along a circumferential direction at the same radius with respect to the two places selected.

(Configuration 6)

A glass substrate for a magnetic disk according to Configuration 1 or 2, wherein an outer peripheral end portion shape of the glass substrate is a shape falling within a range of ±30 nm with respect to a main surface as a reference plane.

(Configuration 7)

A glass substrate for a magnetic disk according to Configuration 1 or 2, wherein a touch-down height is 5 nm or less.

(Configuration 8)

A glass substrate for a magnetic disk according to Configuration 1 or 2, wherein the magnetic disk is a magnetic disk for a load/unload system.

(Configuration 9)

A magnetic disk having at least a magnetic layer formed over a surface of a glass substrate for a magnetic disk according to Configuration 1 or 2.

(Configuration 10)

A magnetic disk manufacturing method, comprising the steps of:

producing a glass substrate for a magnetic disk according to Configuration 1 or 2, and forming at least a magnetic layer over a surface of the glass substrate for the magnetic disk.

(Configuration 11)

A glass substrate for a magnetic disk, wherein, in regions with respect to two places arbitrarily selected on a surface of the glass substrate on a central portion side relative to an outer peripheral end, a surface shape with a shape wavelength in a band of 60 to 500 μm is extracted from surface shapes in each of the regions and, assuming that a root mean square roughness Rq of the surface shape is given as a microwaviness Rq, a difference between standard deviations of the microwavinesses Rq of the regions is 0.04 nm or less.

(Configuration 12)

A glass substrate for a magnetic disk, wherein, in regions with respect to two places arbitrarily selected on a surface of the glass substrate on a central portion side relative to an outer peripheral end, a surface shape with a shape wavelength in a band of 60 to 500 μm is extracted from surface shapes in each of the regions and, assuming that a root mean square roughness Rq of the surface shape is given as a microwaviness Rq, a ratio between standard deviations of the microwavinesses Rq of the regions is 1.1 or less.

(Configuration 13)

A glass substrate for a magnetic disk according to Configuration 11 or 12, wherein the two places are an outer peripheral end portion of the disk and a central portion of a recording/reproducing area of the disk.

(Configuration 14)

A glass substrate for a magnetic disk according to Configuration 13, wherein the outer peripheral end portion of the disk is a point located 1.0 mm inward from an outer peripheral end of the disk toward a center of the disk or a region located inward of the point.

(Configuration 15)

A glass substrate for a magnetic disk according to Configuration 11 or 12, wherein the regions are two regions each extending along a circumferential direction at the same radius with respect to the two places selected.

(Configuration 16)

A glass substrate for a magnetic disk according to Configuration 11 or 12, wherein an outer peripheral end portion shape of the glass substrate is a shape falling within a range of ±30 nm with respect to a main surface as a reference plane.

(Configuration 17)

A glass substrate for a magnetic disk according to Configuration 11 or 12, wherein a touch-down height is 5 nm or less.

(Configuration 18)

A glass substrate for a magnetic disk according to Configuration 11 or 12, wherein the magnetic disk is a magnetic disk for a load/unload system.

(Configuration 19)

A magnetic disk having at least a magnetic layer formed over a surface of a glass substrate for a magnetic disk according to Configuration 11 or 12.

(Configuration 20)

A magnetic disk manufacturing method, comprising the steps of:

producing a glass substrate for a magnetic disk according to Configuration 11 or 12, and forming at least a magnetic layer over a surface of the glass substrate for the magnetic disk.

Effect of the Invention

According to this invention, by setting the microwaviness on a surface of a substrate in a predetermined relationship or in a predetermined range, it is possible to provide a glass substrate for a magnetic disk capable of achieving a desired glide height (touch-down height), the magnetic disk, and a method of manufacturing the magnetic disk.

BEST MODE FOR CARRYING OUT THE INVENTION

Figure 1:
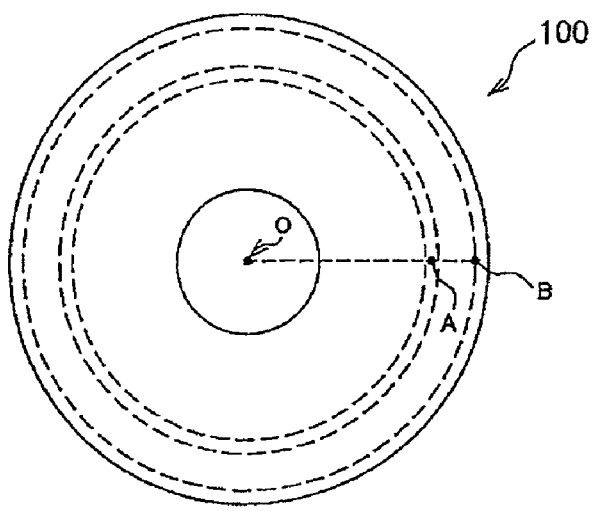
FIG. 1 is an exemplary diagram for explaining selected two places and explaining that use is made of the average value or the standard deviation of data measured continuously along the circumferential direction at the same radius with respect to each of the selected two places.
Figure 2:
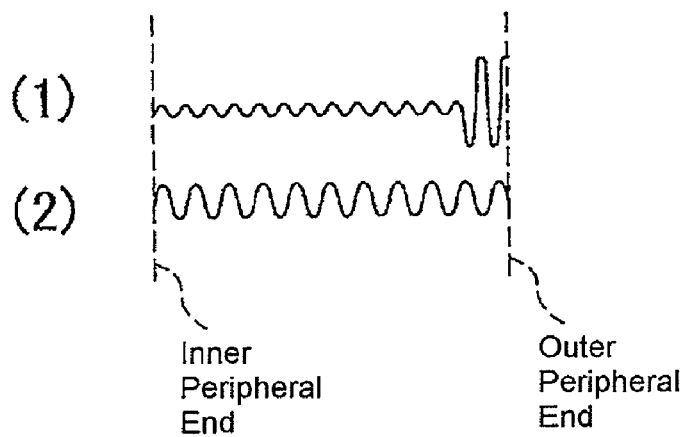
FIG. 2 is an exemplary diagram for explaining an image of this invention.
Figure 3:
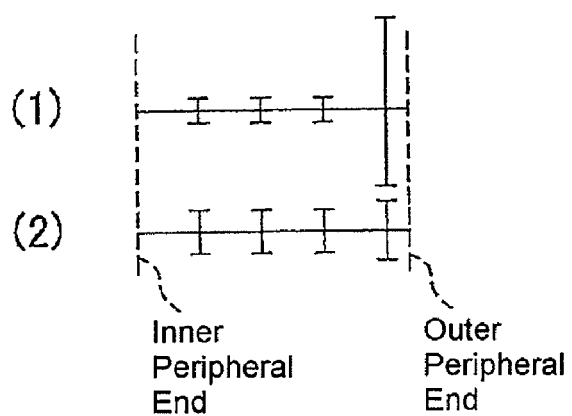
FIG. 3 is an exemplary diagram for explaining an image of this invention.

Hereinbelow, this invention will be described in detail.

A glass substrate for a magnetic disk according to this invention is such that, in regions with respect to two places arbitrarily selected on a surface of the glass substrate on its central portion side relative to its outer peripheral end, a surface shape with a shape wavelength in a band of 60 to 500 μm is extracted from surface shapes in each of the regions and, assuming that a root mean square roughness Rq of the surface shape is given as a microwaviness Rq, a difference between the microwavinesses Rq of the regions is 0.02 nm or less (Configuration 1).

A glass substrate for a magnetic disk according to this invention is such that, in regions with respect to two places arbitrarily selected on a surface of the glass substrate on its central portion side relative to its outer peripheral end, a surface shape with a shape wavelength in a band of 60 to 500 μm is extracted from surface shapes in each of the regions and, assuming that a root mean square roughness Rq of the surface shape is given as a microwaviness Rq, a ratio between the microwavinesses Rq of the regions is 1.1 or less (Configuration 2).

A glass substrate for a magnetic disk according to this invention is such that, in regions with respect to two places arbitrarily selected on a surface of the glass substrate on its central portion side relative to its outer peripheral end, a surface shape with a shape wavelength in a band of 60 to 500 μm is extracted from surface shapes in each of the regions and, assuming that a root mean square roughness Rq of the surface shape is given as a microwaviness Rq, a difference between standard deviations of the microwavinesses Rq of the regions is 0.04 nm or less (Configuration 11).

A glass substrate for a magnetic disk according to this invention is such that, in regions with respect to two places arbitrarily selected on a surface of the glass substrate on its central portion side relative to its outer peripheral end, a surface shape with a shape wavelength in a band of 60 to 500 μm is extracted from surface shapes in each of the regions and, assuming that a root mean square roughness Rq of the surface shape is given as a microwaviness Rq, a ratio between standard deviations of the microwavinesses Rq of the regions is 1.1 or less (Configuration 12).

In this invention, using, for example, a later-described measuring apparatus, a surface shape with a shape wavelength in a band of 60 to 500 µm is extracted from surface shapes in a measurement region and a microwaviness is calculated as a root mean square roughness Rq (RMS) of the surface shape. Herein, a measurement length (Q) portion is extracted from a roughness curve in a direction of its centerline and, assuming that the centerline of this extracted portion is represented by the X-axis, that the direction of longitudinal magnification is represented by the Y-axis, and that the roughness curve is expressed by y=f(x), squares of deviations from the centerline to the roughness curve [f(x)] are integrated over the interval of the measurement length (Q) and then averaged over that interval to derive an average value. Rq (RMS) is a square root of this average value. The relationship with Rq (RMS) (root mean square roughness) prescribed by JIS B 0601 is the same. The relationship with Wq (root mean square waviness) prescribed by JIS B 0601 is the same.

In this invention, a laser Doppler vibrometer (LDV) was used for measuring the surface state. The measurement principle of this measuring apparatus is that a He—Ne laser beam with a wavelength of 633 nm, for example, is split into two beams, i.e. a measurement beam and a comparison beam, and the phase difference between the two beams is detected, thereby measuring the shape of a measurement object based on that phase difference. A feature of this measuring apparatus is that it is an optical interferometer that irradiates laser light onto an object and detects the speed based on the frequency difference between the irradiated light and its reflected light. A feature of this measuring apparatus is that it is possible to measure a wide frequency band from the surface roughness to the waviness and that it is possible to measure the entire surface of a disk. The horizontal resolution is about 5 µm and the vertical measurement resolution is 0.001 nm (0.01 Å). The parameter to be obtained is Rq (RMS).

The laser Doppler vibrometer is exemplified by Optical Process Certifier M4224 manufactured by THoT Technologies, Inc. or the like.

In this invention, as the above-mentioned two places, it is preferable to select two places at different distances from the center of the disk. This is because the correlation appears strongly as compared with the case where other two places (e.g. in the circumferential direction) are selected.

In this invention, for the above-mentioned two places, the vicinity of an outer peripheral end portion (excluding an outer peripheral end face, i.e. a substrate side face) of the disk is preferably selected as one of the two places and a place considered to show a typical value of a recording/reproducing area (e.g. a central portion of the recording/reproducing area, for example, an intermediate position of a line connecting between inner and outer peripheral ends of the disk) is preferably selected as the other of the two places (Configurations 3 and 13). This is because the correlation appears more strongly as compared with the case where other two places are selected.

For example, in the case of a glass substrate for a 2.5-inch magnetic disk with an inner diameter of 20 mm and an outer diameter of 65 mm (inner peripheral end 10 mm and outer peripheral end 32.5 mm measured from a central portion), the vicinity of an outer peripheral end portion of the disk (e.g. a fixed point or a region at a radius 31.5±0.05 mm position from the center of the substrate) is preferably selected as one place and a central portion of a recording/reproducing area (e.g. a fixed point or a region at a radius 25 mm±3 mm position from the center of the substrate) is preferably selected as the other place. The region can be a 0.05 to 3 mm square region.

Figure 5:
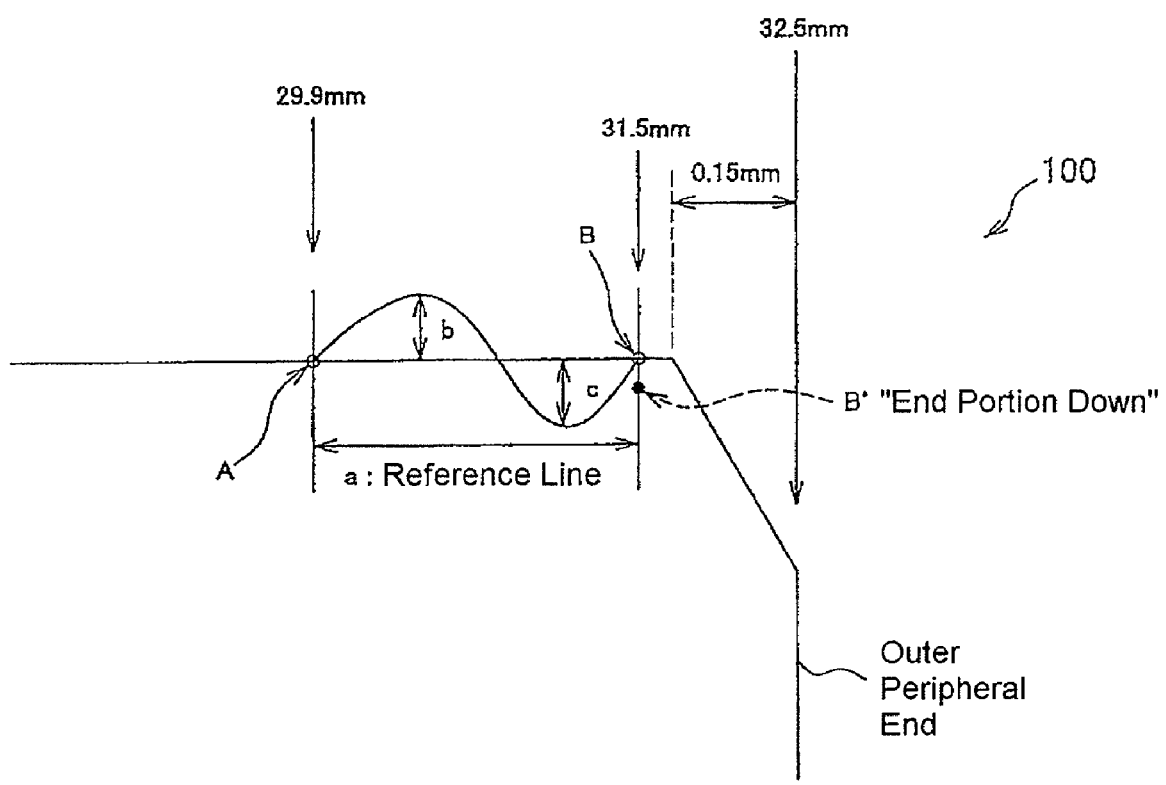
FIG. 5 is an exemplary diagram for explaining Duboff.

The region in the vicinity of the outer peripheral end portion of the disk is preferably, for example, a point located 1.0 mm inward from the outer peripheral end of the disk toward the center of the disk or a region located inward of the point (Configurations 4 and 14) (see FIG. 5). This is regardless of the substrate size. This is applicable to, for example, a 1.8-inch, 2.5-inch, 3.3-inch, or 3.5-inch substrate.

In this invention, it is preferable to use the average value of data measured along the circumferential direction at the same radius with respect to each of the selected two places (Configuration 5). This is because it is preferable to use the typical value at the positions of each radius and the accuracy of correlation is improved thereby.

For example, as shown in FIG. 1, with respect to each of selected two places (A has a width and B is one point), it is preferable to use the average value of data measured continuously along the circumferential direction at the same radius from the center O of a disk as indicated by imaginary lines.

In this invention, the number of data to be measured continuously along the circumference with the same radius can be properly adjusted.

In this invention, it is alternatively possible to intermittently set a plurality of measurement regions at regular intervals along the circumferential direction at the same radius and to use the average value of data measured in each of the measurement regions.

In this invention, with respect to the selected two places, two regions each extending along the circumferential direction at the same radius are set as measurement regions, and it is preferable to use the standard deviation of data measured in each of the measurement regions (Configuration 15). This is because it is preferable to increase the parameters of the standard deviation and the accuracy of correlation is improved thereby.

For example, as shown in FIG. 1, with respect to each of selected two places (A has a width and B is one point), it is preferable to use the standard deviation of data measured continuously along the circumferential direction at the same radius from the center O of a disk as indicated by imaginary lines.

In this invention, the number of data to be measured continuously along the circumference with the same radius can be properly adjusted.

In this invention, it is alternatively possible to intermittently set a plurality of measurement regions at regular intervals along the circumferential direction at the same radius and to use the standard deviation of data measured in each of the measurement regions.

Figure 4:
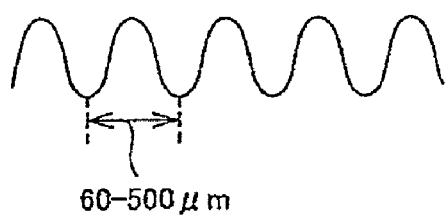
FIG. 4 is an exemplary diagram for explaining a shape wavelength.

In this invention, it is preferable to extract a surface shape with a shape wavelength in a band of 60 to 500 µm from surface shapes in the measurement region. As shown in FIG. 4, the shape wavelength represents the distance between adjacent troughs or the distance between adjacent peaks.

When the shape wavelength is 500 to 1000 µm, the correlation is not good even if measured under the same conditions as in FIGS. 7, 8, 9, and 10 (see FIGS. 17, 18, 19, and 20).

When the shape wavelength is 10 to 60 µm, the correlation is not good even if measured under the same conditions as in FIGS. 7, 8, 9, and 10 (see FIGS. 21, 22, 23, and 24).

From the above, it is seen that the upper limit of the shape wavelength is preferably about half the head size. Therefore, when the head size is reduced in the future, the upper limit of the shape wavelength is preferably set to about half the head size accordingly.

In this invention, the outer peripheral end portion shape of the glass substrate is preferably a shape falling within a range of ±30 nm with respect to its main surface as a reference plane (Configurations 6 and 16).

This is because when Duboff described above is 30 nm or less, the effect of the application of this invention largely appears. Further, this is because when Duboff is greater than 30 nm, it is possible to reduce the touch-down height (TDH) at the outer peripheral end portion position to a certain limit by reducing Duboff.

In this invention, a magnetic head is preferably a magnetic head for a perpendicular magnetic recording medium. In particular, it is preferably a head of the type in which a stylus projects to approach a disk.

In the magnetic disk and its glass substrate according to this invention, the average value of the microwaviness (MW-Rq) over the entire surface of the substrate is preferably 4 Å or less.

This is because when the average value of the microwaviness (MW-Rq) is 4 Å (0.4 nm) or less, the effect of the application of this invention largely appears. Further, this is because when the average value of the microwaviness (MW-Rq) is greater than 4 Å (0.4 nm), it is not necessary to apply this invention.

With respect to the magnetic disk and its glass substrate according to this invention, the touch-down height is preferably 5 nm or less (Configurations 7 and 17).

This is because when the touch-down height is 5 nm or less, the effect of the application of this invention largely appears. Further, this is because when the touch-down height is greater than 5 nm, it is not necessary to apply this invention.

The touch-down height is an index for determining how close a head can approach a surface of a disk. The touch-down height is measurable using a film-formed medium (i.e. a magnetic recording medium).

The glide height (flying height) represents the average height of flying over a substrate. The glide height is a value virtually derived by a tester, using a film-formed medium, i.e. a non-transparent object.

Through measurement with the formation of an extremely thin film on a surface of a glass substrate, it is possible to substantially know the surface state of the glass substrate.

This invention includes the case where the surface state of the film-formed medium satisfies the condition defined in Configuration 1, 2, 11, or 12 described above.

In the case of an in-plane magnetic recording medium, since the thickness of a magnetic layer and so on is small, it may be considered that the surface state of a glass substrate is approximately equal to that of the film-formed medium. On the other hand, in the case of a perpendicular magnetic recording medium, since the thickness of a magnetic layer and so on is large, the surface state of the film-formed medium becomes rougher than that of a glass substrate, but since the degree of roughness caused by the film formation is constant, it may be considered that the correlation is achieved before and after the film formation.

The magnetic disk and its glass substrate according to this invention are preferably a magnetic disk for a load/unload system and its glass substrate (Configurations 8 and 18).

This is because the difference or ratio between the microwavinesses Rq of the respective regions selected with respect to the above-mentioned two places particularly becomes a problem in the case of the magnetic disk for the load/unload system and its glass substrate.

The magnetic disk and its glass substrate according to this invention are preferably a magnetic disk adapted to be mounted in a HDD for use at 4,200 rpm or more and its glass substrate (Configurations 9 and 19).

This is because when mounted in the HDD for use at 4,200 rpm or more, the effect of the application of this invention largely appears.

The magnetic disk of this invention has at least a magnetic layer formed over the surface of the glass substrate for the magnetic disk according to any of Configurations 1 to 7 described above (Configurations 10 and 22).

The magnetic disk and its glass substrate according to this invention are suitably applicable to a perpendicular magnetic recording medium.

A perpendicular magnetic recording disk has at least a perpendicular magnetic recording layer over a substrate.

Herein, the perpendicular magnetic recording layer is preferably, for example, a perpendicular magnetic recording layer having, at least, a ferromagnetic layer with a granular structure formed over the substrate and containing an oxide, silicon (Si), or an oxide of silicon (Si) and a laminated layer, on the ferromagnetic layer, of a first layer containing Co or a Co alloy and a second layer containing Pd or Pt.

As a Co-based magnetic material forming the ferromagnetic layer, particularly a CoPt-based or CoPtCr-based magnetic material is preferable. Si may be added alone or an oxide or a Si oxide such as $SiO_2$ may be added to the CoPt-based or CoPtCr-based magnetic material. The ferromagnetic layer preferably has crystal grains composed mainly of Co and grain boundary portions composed mainly of the oxide, silicon (Si), or the silicon (Si) oxide. The ferromagnetic layer preferably has a granular structure containing Si or its oxide between magnetic crystal grains containing Co. The thickness of the ferromagnetic layer is preferably 20 nm or less. Desirably, the range of 8 to 16 nm is preferable.

The laminated layer is adjacent to the ferromagnetic layer directly or through a spacer layer and has a function of magnetically coupling to the ferromagnetic layer and aligning the easy magnetization axis directions in the respective layers in approximately the same direction. In the laminated layer, crystal grains are magnetically coupled to each other. Specifically, with respect to the ferromagnetic layer made of the Co-based magnetic material, the laminated layer preferably comprises alternately laminated films of cobalt (Co) or its alloy and palladium (Pd) or alternately laminated films of cobalt (Co) or its alloy and platinum (Pt). Since the alternately laminated films made of such materials have large magnetic Ku, the domain wall width in the laminated layer can be made small. The thickness thereof is preferably 1 to 8 nm. Desirably, 2 to 5 nm is preferable. The same effect is obtained even by using CoCrPt with high Pt content, CoPt, CoPd, FePt, $CoPt_3$, or $CoPd_3$ as a material of the laminated layer, instead of the above-mentioned multilayer film.

The spacer layer is preferably provided between the ferromagnetic layer and the laminated layer. By providing the spacer layer, it is possible to suitably control the exchange coupling between the ferromagnetic layer and the laminated layer. As the spacer layer, a Pd layer or a Pt layer is suitably used depending on the laminated layer, for example. When the Pd layer is used in the laminated layer, the Pd layer is also used as the spacer layer. This is because, in terms of the restriction of a manufacturing apparatus, it is economically preferable to use the same composition. The thickness of the spacer layer is preferably 2 nm or less and desirably in the range of 0.5 to 1.5 nm.

The ferromagnetic layer and the laminated layer are disposed adjacent to each other or through the spacer layer therebetween, wherein, in terms of HDI (Head Disk Interface), it is preferable to dispose the laminated layer above the ferromagnetic layer as seen from the substrate. The ferromagnetic layer is not limited to a single layer, but may comprise a plurality of layers. In this case, Co-based magnetic layers containing Si or a Si oxide may be combined together or a Co-based magnetic layer containing Si or a Si oxide and a Co-based magnetic layer not containing Si or a Si oxide may be combined together. It is preferable to dispose the Co-based magnetic layer containing Si or the Si oxide on the side adjacent to the laminated layer. As a method of forming the perpendicular magnetic recording layer, it is preferable to use a sputtering method. In particular, it is preferable to use a DC magnetron sputtering method because uniform film formation is enabled.

The perpendicular magnetic recording disk has at least the above-mentioned perpendicular magnetic recording layer over the substrate and preferably has various functional layers in addition thereto.

For example, a soft magnetic layer for suitably adjusting a magnetic circuit of the perpendicular magnetic recording layer may be provided over the substrate. The soft magnetic layer is not particularly limited as long as it is made of a magnetic substance that exhibits soft magnetic properties, and, for example, preferably has as its magnetic property a coercive force (Hc) of 0.01 to 80 oersteds and more preferably 0.01 to 50 oersteds. Further, it preferably has as its magnetic property a saturation magnetic flux density (Bs) of 500 emu/cc to 1920 emu/cc. As a material of the soft magnetic layer, there can be cited a Fe-based material, a Co-based material, or the like. For example, use can be made of a Fe-based soft magnetic material such as FeTaC-based alloy, FeTaN-based alloy, FeNi-based alloy, FeCoB-based alloy, or FeCo-based alloy, a Co-based soft magnetic material such as CoTaZr-based alloy or CoNbZr-based alloy, a FeCo-based alloy soft magnetic material, or the like. The thickness of the soft magnetic layer is preferably 30 nm to 1000 nm and desirably 50 nm to 200 nm.

A nonmagnetic underlayer is preferably provided over the substrate for orienting crystals of the perpendicular magnetic recording layer in a direction perpendicular to the surface of the substrate. A Ti-based alloy is preferable as a material of the nonmagnetic underlayer. The Ti-based alloy well serves to control crystal axes (C-axes) of the CoPt-based perpendicular magnetic recording layer having a hcp crystal structure to be oriented in the perpendicular direction, which is thus preferable. As the nonmagnetic underlayer made of the Ti-based alloy, there can be cited, other than Ti, a TiCr-based alloy, a TiCo-based alloy, or the like. The thickness of such a nonmagnetic underlayer is preferably 2 nm to 30 nm.

When magnetic field annealing is necessary for controlling magnetic domains of the soft magnetic layer, the substrate is preferably made of a glass. Since the glass substrate is excellent in heat resistance, the heating temperature of the substrate can be set high. As the glass for the substrate, there can be cited an aluminosilicate glass, an aluminoborosilicate glass, a soda lime glass, or the like. Among them, the aluminosilicate glass is preferable. Further, an amorphous glass or a crystallized glass can be used. When the soft magnetic layer is amorphous, the substrate is preferably made of the amorphous glass. When a chemically strengthened glass is used, the rigidity is high, which is thus preferable. In this invention, the surface roughness of the main surface of the substrate is preferably 6 nm or less in Rmax and 0.6 nm or less in Ra. By providing such a smooth surface, a gap between perpendicular magnetic recording layer-soft magnetic layer can be set constant so that it is possible to form a suitable magnetic circuit between magnetic head—perpendicular magnetic recording layer—soft magnetic layer.

It is also preferable to form an adhesive layer between the substrate and the soft magnetic layer. By forming the adhesive layer, the adhesion between the substrate and the soft magnetic layer can be improved and therefore it is possible to prevent stripping of the soft magnetic layer. As a material of the adhesive layer, use can be made of, for example, a Ti-containing material. In terms of practical use, the thickness of the adhesive layer is preferably set to 1 nm to 50 nm.

In the perpendicular magnetic recording disk, it is preferable to provide a protective layer on the perpendicular magnetic recording layer. By providing the protective layer, it is possible to protect the surface of the magnetic disk from the magnetic recording head flying over the magnetic disk. As a material of the protective layer, a carbon-based protective layer, for example, is preferable. The thickness of the protective layer is preferably about 3 nm to 7 nm.

It is preferable to further provide a lubricating layer on the protective layer. By providing the lubricating layer, abrasion between the magnetic head and the magnetic disk can be suppressed so that the durability of the magnetic disk can be improved. As a material of the lubricating layer, PFPE (perfluoropolyether), for example, is preferable. The thickness of the lubricating layer is preferably about 0.5 nm to 1.5 nm.

It is preferable that the soft magnetic layer, the underlayer, the adhesive layer, and the protective layer be also formed by the sputtering method. In particular, the DC magnetron sputtering method is preferable because uniform film formation is enabled. It is also preferable to use an in-line type film forming method. Further, the lubricating layer is preferably formed by, for example, a dip coating method.

The magnetic disk and its glass substrate according to this invention are also applicable to a discrete-type medium.

A magnetic disk manufacturing method of this invention comprises a step of producing the glass substrate for the magnetic disk according to Configuration 1 or 2 or Configuration 11 or 12 described above, and a step of forming at least a magnetic layer over the surface of the glass substrate for the magnetic disk (Configurations 10 and 20).

The step of producing the glass substrate for the magnetic disk manufactures a glass substrate for a magnetic disk having the feature described in Configuration 1, 2, 11, 12, or the like (the feature that the difference or ratio between the microwavinesses Rq of the respective regions selected with respect to the two places falls in the predetermined range) in, for example, lapping and polishing processes.

More specifically, the step of manufacturing the glass substrate for the magnetic disk comprises, for example, (1) Rough Lapping Process, (2) Shaping Process, (3) End Face Polishing Process, (4) Precision Lapping Process, (5) First Polishing Process, (6) Second Polishing (Final Polishing) Process, (7) Cleaning Process, (8) Chemical Strengthening Process, (9) Cleaning Process, and (10) Evaluation Process. For example, by controlling the properties of a polishing pad (polishing cloth), the polishing conditions, and so on in the polishing processes, particularly by controlling the properties of a polishing pad (polishing cloth), the polishing conditions, and so on in the second polishing (final polishing) process, it is possible to manufacture a glass substrate for a magnetic disk having the above-mentioned feature.

Hereinbelow, Examples and Comparative Examples will be described.

EXAMPLES 1 TO 5, COMPARATIVE EXAMPLES 1 TO 5

Figure 6:
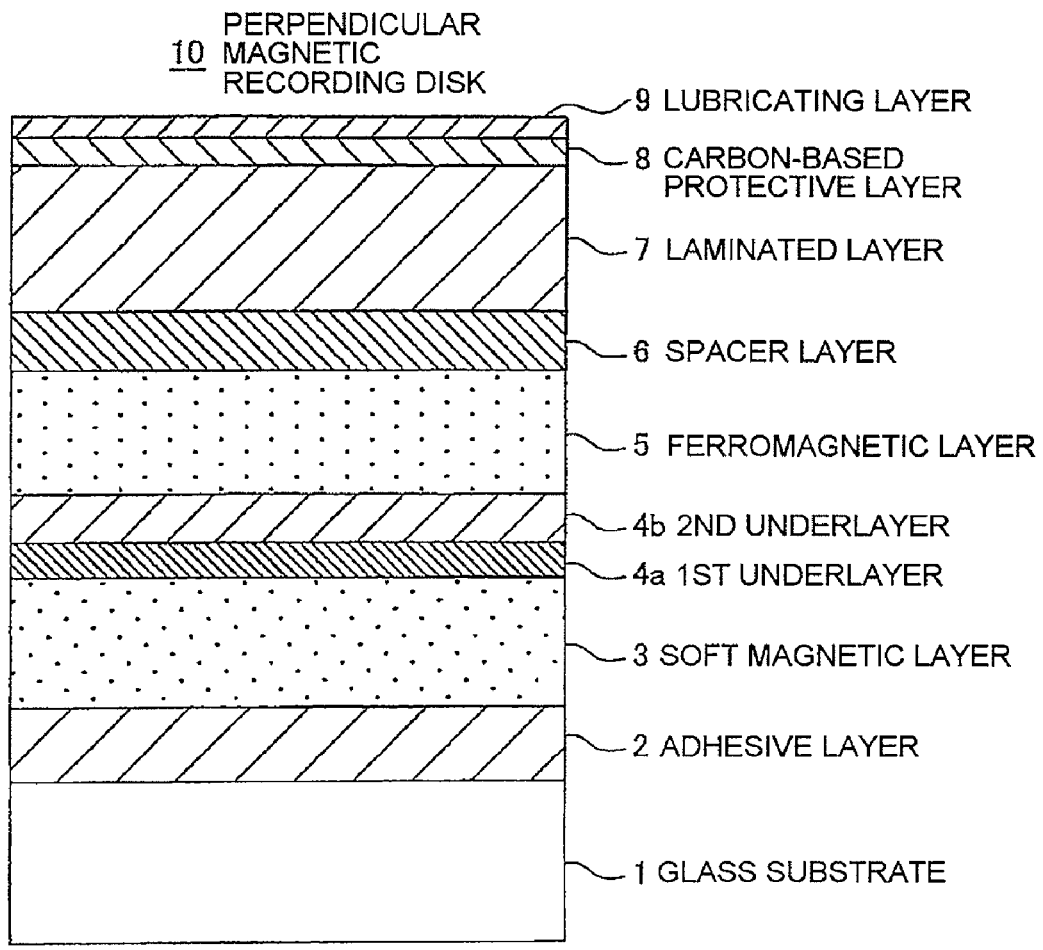
FIG. 6 is an exemplary diagram for explaining the structure of a perpendicular magnetic recording disk manufactured in Examples 1 to 5 and Comparative Examples 1 to 5.
Figure 7:
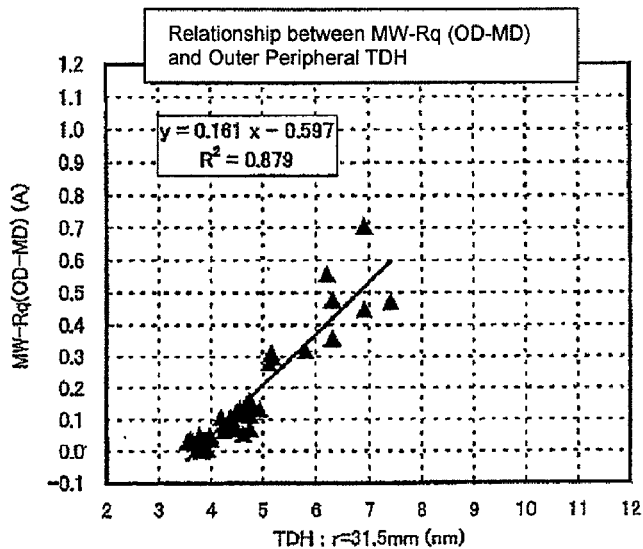
FIG. 7 is a diagram for explaining that the correlation is observed between the difference (MW-Rq (OD-MD)) between microwavinesses in the radial direction and the touch-down height (TDH).
Figure 8:
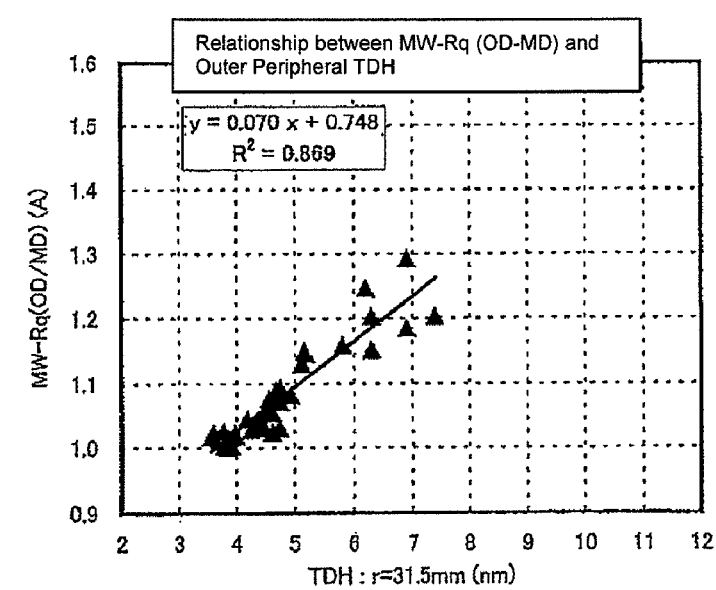
FIG. 8 is a diagram for explaining that the correlation is observed between the ratio (MW-Rq (OD/MD)) between microwavinesses (MW-Rq) in the radial direction and the touch-down height (TDH).
Figure 9:
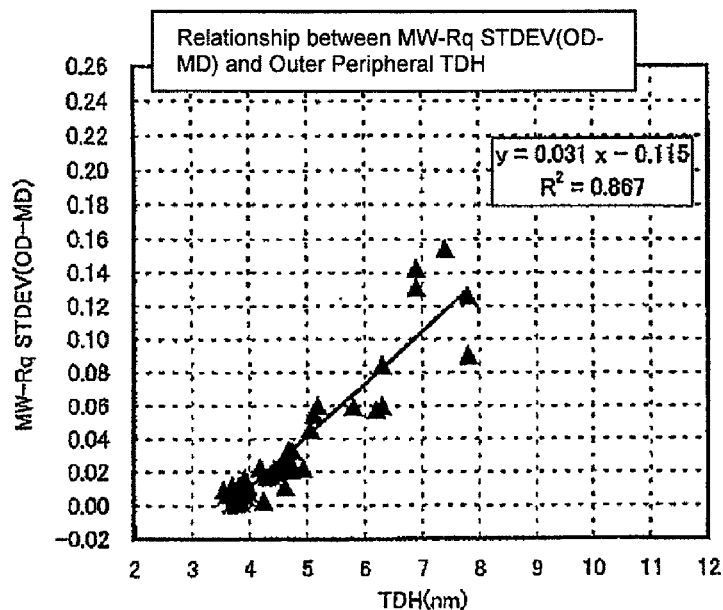
FIG. 9 is a diagram for explaining that the correlation is observed between the difference (MW-Rq STDEV (OD-MD)) between standard deviations of microwavinesses in the circumferential direction and the touch-down height (TDH).
Figure 10:
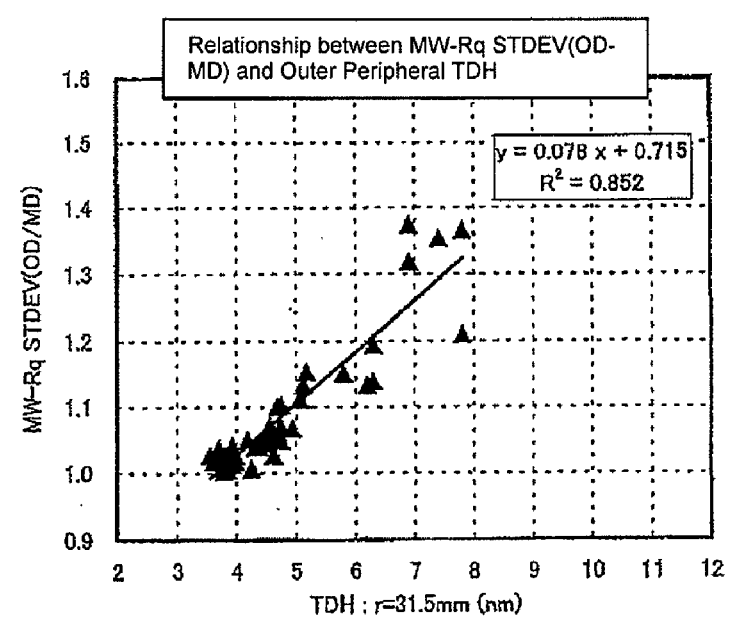
FIG. 10 is a diagram for explaining that the correlation is observed between the ratio (MW-Rq STDEV (OD/MD)) between standard deviations of microwavinesses in the circumferential direction and the touch-down height (TDH).
Figure 11:
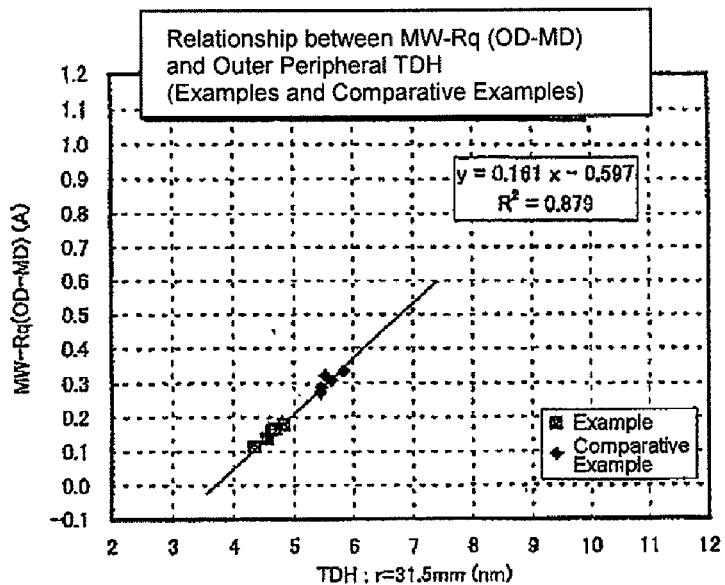
FIG. 11 is a diagram showing the relationship between the difference (MW-Rq (OD-MD)) between microwavinesses in the radial direction and the touch-down height (TDH) with respect to samples obtained in Examples and Comparative Examples.
Figure 12:
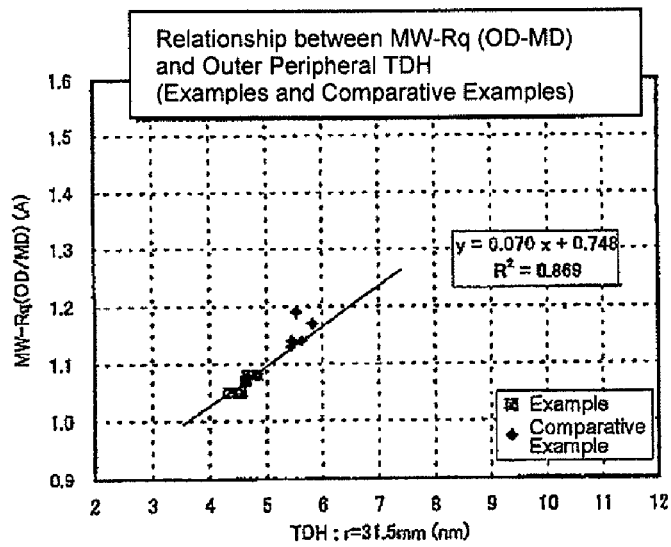
FIG. 12 is a diagram showing the relationship between the ratio (MW-Rq (OD/MD)) between microwavinesses in the radial direction and the touch-down height (TDH) with respect to samples obtained in Examples and Comparative Examples.
Figure 13:
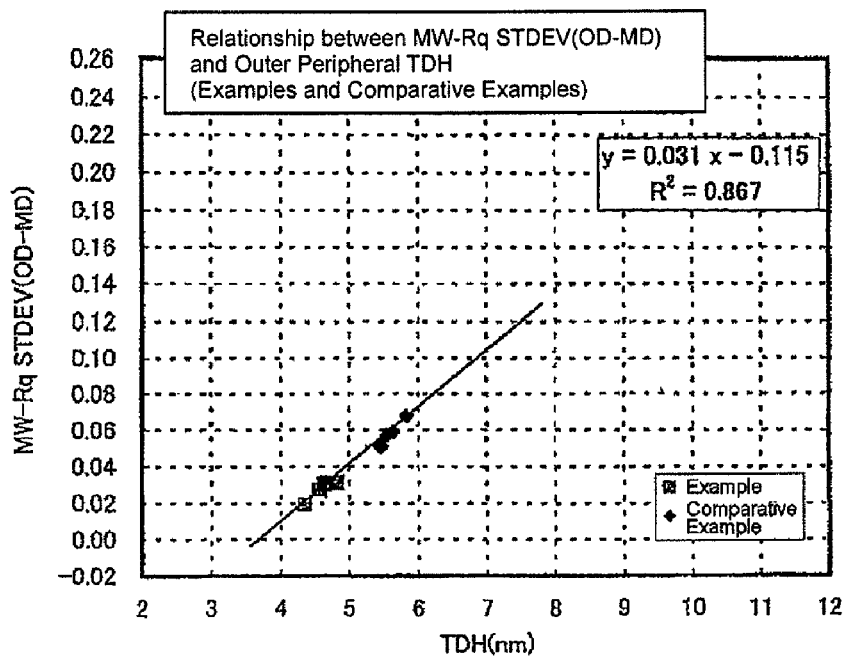
FIG. 13 is a diagram showing the relationship between the difference (MW-Rq STDEV (OD-MD)) between standard deviations of microwavinesses in the circumferential direction and the touch-down height (TDH) with respect to samples obtained in Examples and Comparative Examples.
Figure 14:
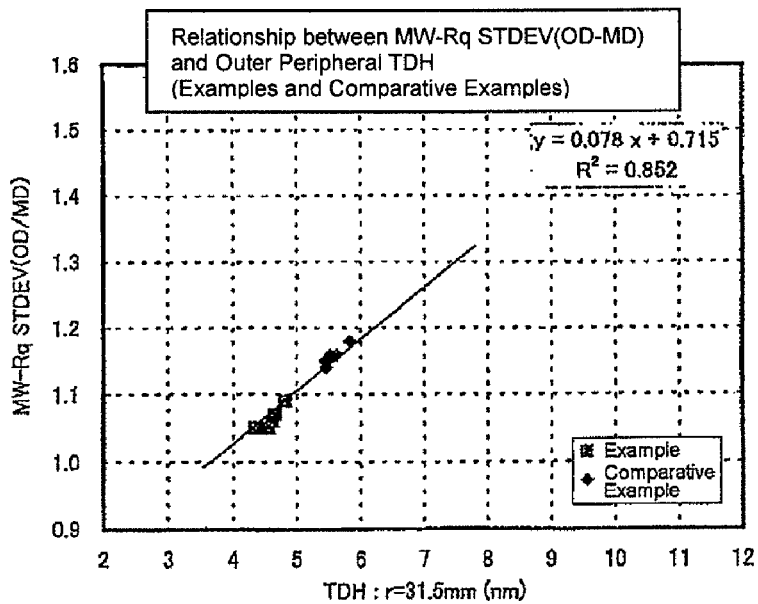
FIG. 14 is a diagram showing the relationship between the ratio (MW-Rq STDEV (OD/MD)) between standard deviations of microwavinesses in the circumferential direction and the touch-down height (TDH) with respect to samples obtained in Examples and Comparative Examples.
Figure 15:
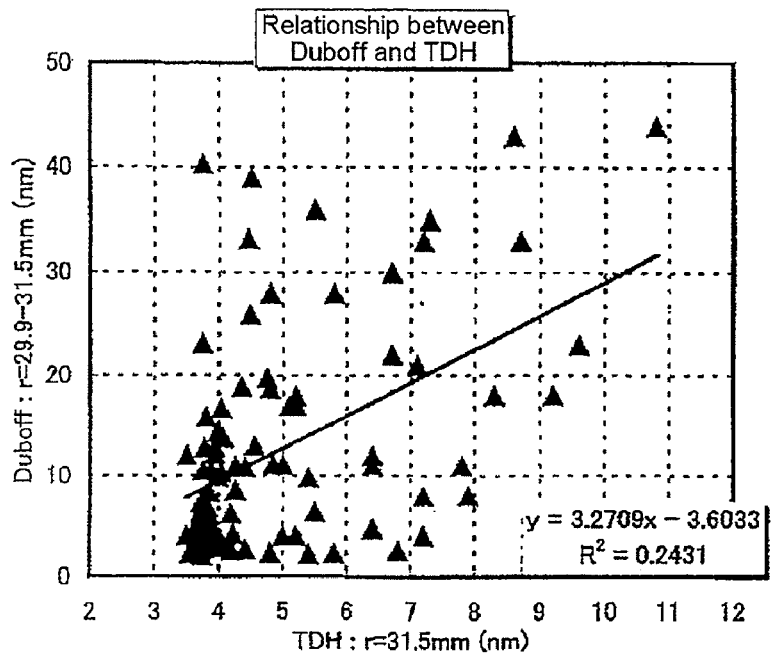
FIG. 15 is a diagram for explaining that no correlation is observed between Duboff and the touch-down height (TDH).
Figure 16:
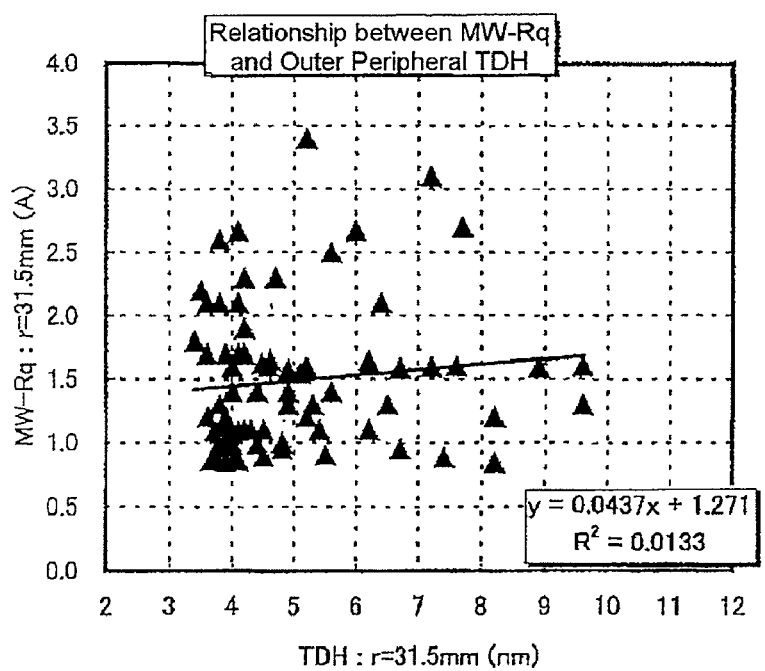
FIG. 16 is a diagram for explaining that no correlation is observed between the microwaviness (MW-Rq) and the touch-down height (TDH).
Figure 17:
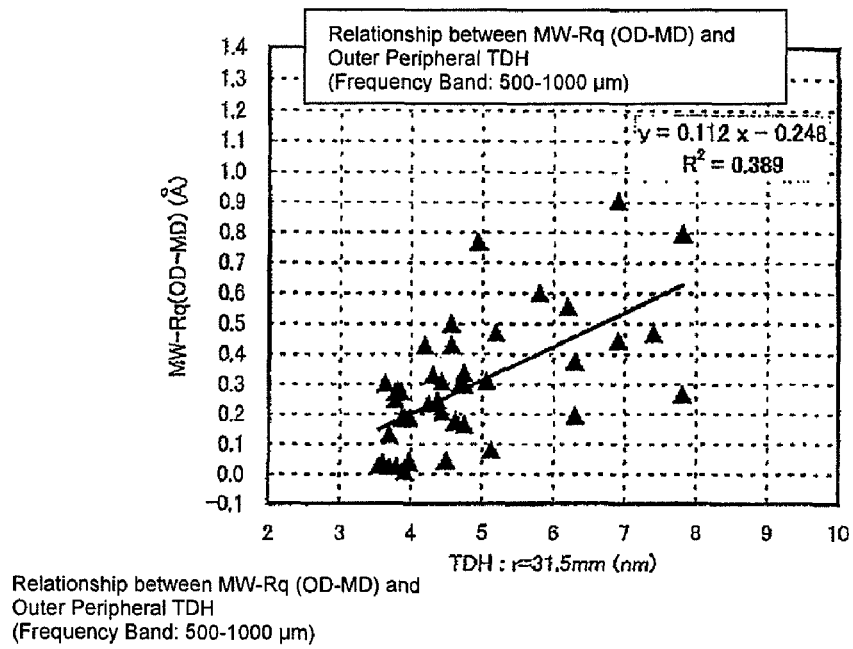
FIG. 17 is a diagram for explaining that when the shape wavelength is 500 to 1000 μm, the correlation between the difference (MW-Rq (OD-MD)) between microwavinesses in the radial direction and the touch-down height (TDH) is not good.
Figure 18:
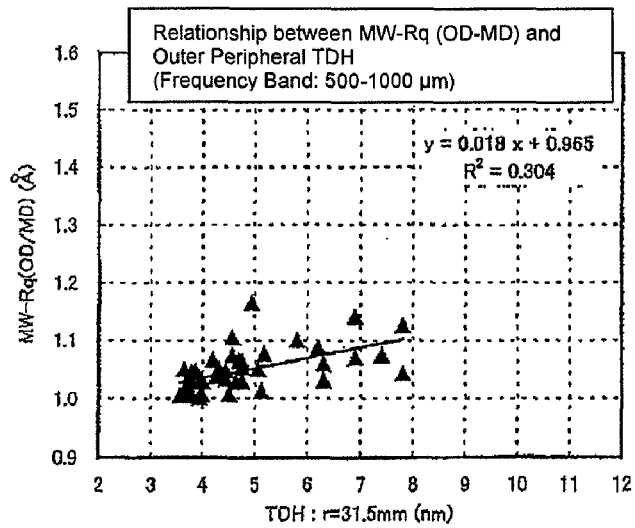
FIG. 18 is a diagram for explaining that when the shape wavelength is 500 to 1000 μm, the correlation between the ratio (MW-Rq (OD/MD)) between microwavinesses in the radial direction and the touch-down height (TDH) is not good.
Figure 19:
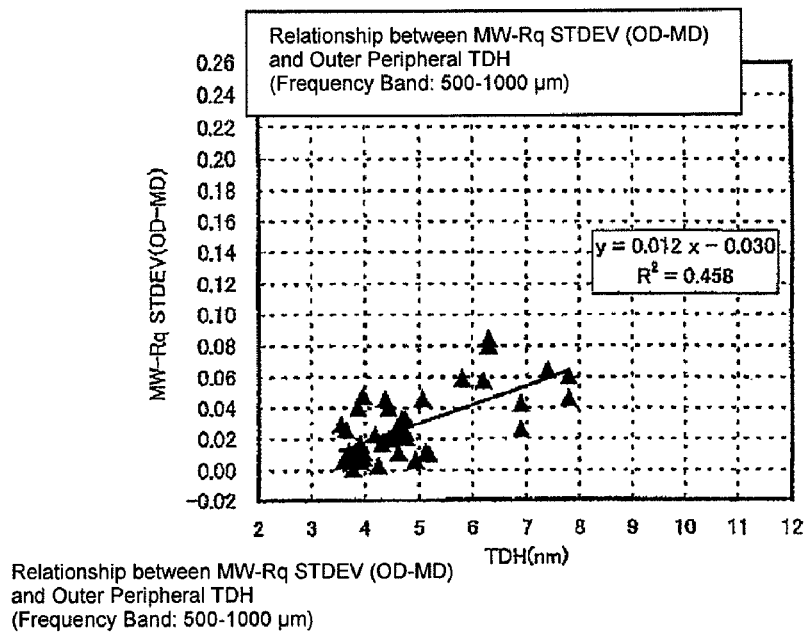
FIG. 19 is a diagram for explaining that when the shape wavelength is 500 to 1000 μm, the correlation between the difference (MW-Rq STDEV (OD-MD)) between standard deviations of microwavinesses in the circumferential direction and the touch-down height (TDH) is not good.
Figure 20:
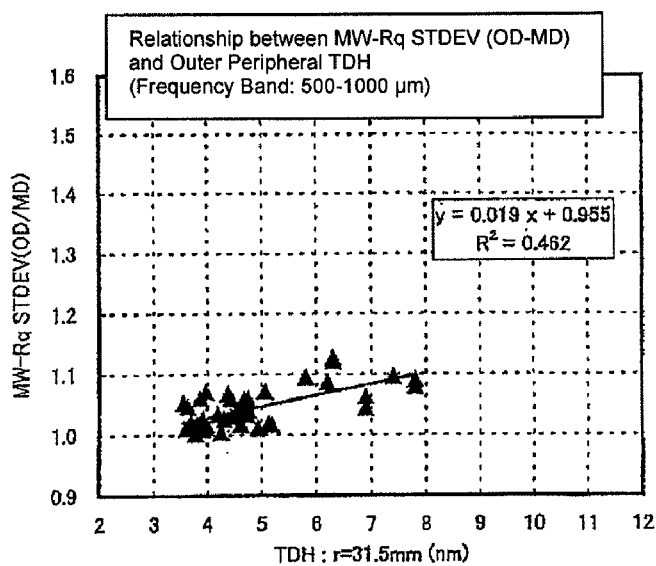
FIG. 20 is a diagram for explaining that when the shape wavelength is 500 to 1000 μm, the correlation between the ratio (MW-Rq STDEV (OD/MD)) between standard deviations of microwavinesses in the circumferential direction and the touch-down height (TDH) is not good.
Figure 21:
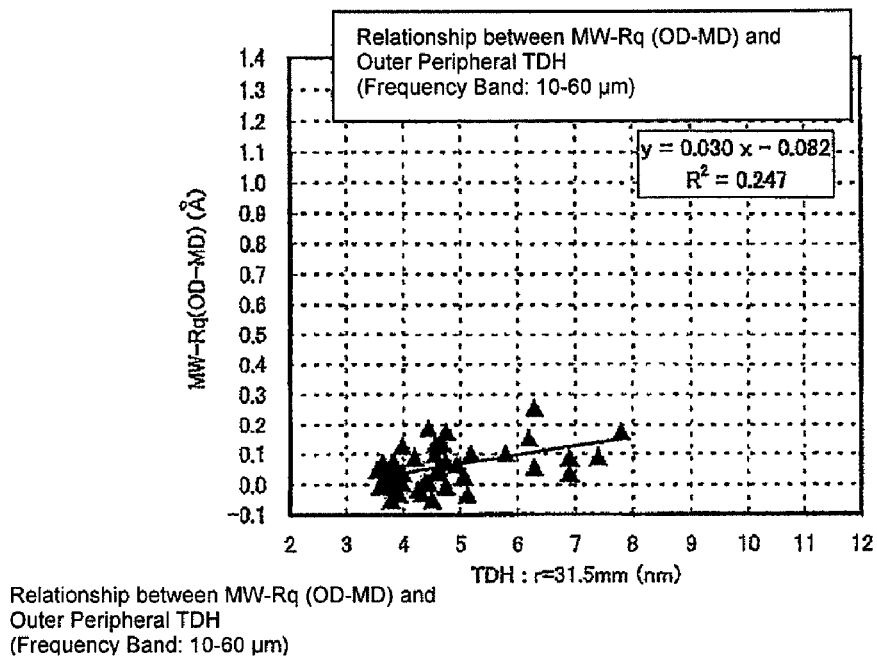
FIG. 21 is a diagram for explaining that when the shape wavelength is 10 to 60 μm, the correlation between the difference (MW-Rq (OD-MD)) between microwavinesses in the radial direction and the touch-down height (TDH) is not good.
Figure 22:
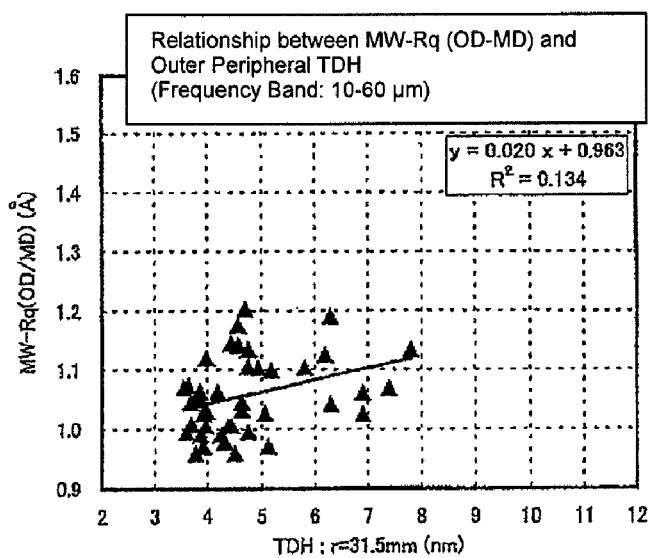
FIG. 22 is a diagram for explaining that when the shape wavelength is 10 to 60 μm, the correlation between the ratio (MW-Rq (OD/MD)) between microwavinesses in the radial direction and the touch-down height (TDH) is not good.
Figure 23:
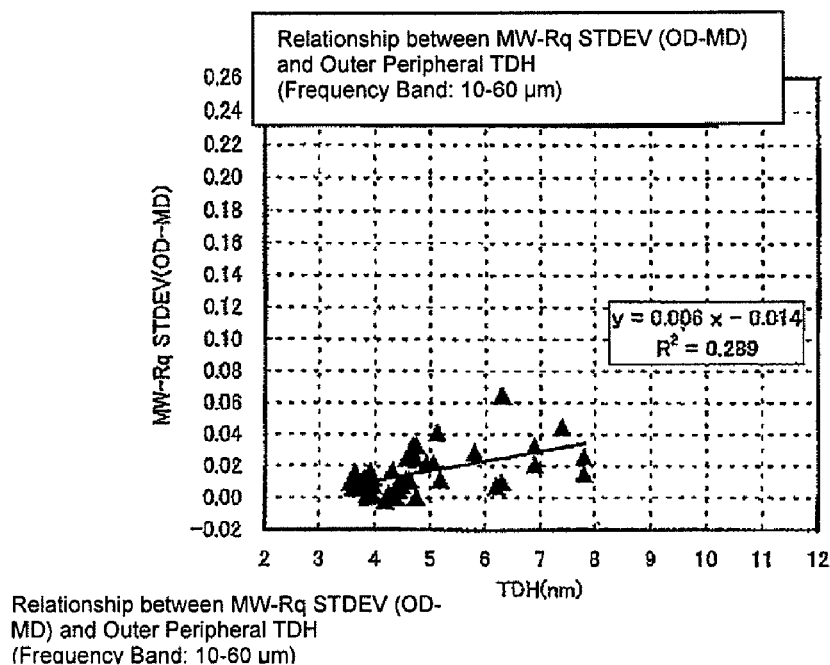
FIG. 23 is a diagram for explaining that when the shape wavelength is 10 to 60 μm, the correlation between the difference (MW-Rq STDEV (OD-MD)) between standard deviations of microwavinesses in the circumferential direction and the touch-down height (TDH) is not good.
Figure 24:
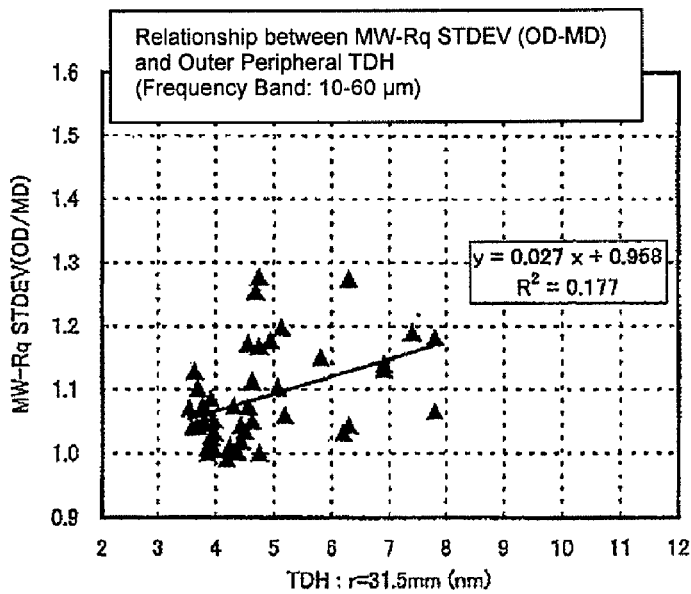
FIG. 24 is a diagram for explaining that when the shape wavelength is 10 to 60 μm, the correlation between the ratio (MW-Rq STDEV (OD/MD)) between standard deviations of microwavinesses in the circumferential direction and the touch-down height (TDH) is not good.

FIG. 6 is an exemplary diagram for explaining the structure of a perpendicular magnetic recording disk manufactured in Examples 1 to 5 and Comparative Examples 1 to 5. Hereinbelow, a manufacturing example of a perpendicular magnetic recording disk will be described with reference to FIG. 6.

An amorphous aluminosilicate glass was molded into a disk shape by direct press, thereby producing a glass disk. This glass disk was lapped, polished, and chemically strengthened in sequence, thereby obtaining a smooth nonmagnetic glass substrate 1 in the form of a chemically strengthened glass disk. The glass substrate 1 is a 2.5-inch glass substrate with an inner diameter of 20 mm and an outer diameter of 65 mm (inner peripheral end 10 mm and outer peripheral end 32.5 mm measured from a central portion). The surface roughness of a main surface of the glass substrate 1 was measured by an AFM (atomic force microscope) and it was a smooth surface shape with Rmax being 4.8 nm and Ra being 0.42 nm. Rmax and Ra follow Japanese Industrial Standard (JIS).

By controlling the properties of a polishing pad, the polishing conditions, and so on in the polishing process, there were manufactured glass substrates for magnetic disks, each having a value of Duboff, an average value of microwaviness (MW-Rq) over the entire surface of the substrate, a value of the difference (MW-Rq (OD-MD)) between microwavinesses in the radial direction, and a value of the ratio (MW-Rq (OD/MD)) between microwavinesses in the radial direction, which are shown in Table 1.

By controlling the properties of a polishing pad, the polishing conditions, and so on in the polishing process, there were manufactured glass substrates for magnetic disks, each having a value of Duboff, an average value of microwaviness (MW-Rq) over the entire surface of the substrate, a value of the difference (MW-Rq STDEV (OD-MD)) between standard deviations of microwavinesses in the circumferential direction, and a value of the ratio (MW-Rq STDEV (OD/MD)) between standard deviations of microwavinesses in the circumferential direction, which are shown in Table 2.

Then, using an evacuated film forming apparatus, an adhesive layer 2 and a soft magnetic layer 3 were formed in sequence on the obtained glass substrate 1 in an Ar atmosphere by the DC magnetron sputtering method. In this event, the adhesive layer 2 was formed by the use of a Ti target so as to be a Ti layer having a thickness of 20 nm. On the other hand, the soft magnetic layer 3 was formed by the use of a CoTaZr target so as to be an amorphous CoTaZr (Co:88 at %, Ta:7.0 at %, Zr:4.9 at %) layer having a thickness of 200 nm.

Then, using an evacuated single-wafer stationary facing type film forming apparatus, a first underlayer 4a, a second underlayer 4b, a ferromagnetic layer 5, a spacer layer 6, a laminated layer 7, and a carbon-based protective layer 8 were formed in sequence on the obtained substrate in an Ar atmosphere by the DC magnetron sputtering method.

Specifically, on the substrate finished with the film formation up to the soft magnetic layer 3, the first underlayer 4a made of amorphous NiTa (Ni:45 at %, Ta:55 at %) and having a thickness of 10 nm and the second underlayer 4b made of Ru and having a thickness of 30 nm were first formed. Herein, two layers each made of Ru may be formed instead. That is, by forming the upper-layer side Ru at a gas pressure of nitrogen (N) gas higher than that used when forming the lower-layer side Ru, the crystal orientation can be improved.

Then, using a hard magnetic target made of CoCrPt containing $SiO_2$, the ferromagnetic layer 5 of 15 nm having a hcp crystal structure was formed. The composition of the target for forming the ferromagnetic layer 5 was Co:62 at %, Cr:10 at %, Pt:16 at %, $SiO_2$:12 at %. The ferromagnetic layer 5 was formed at a gas pressure of 30 mTorr. Then, the spacer layer 6 made of Pd and having a thickness of 0.9 nm was formed. Further, the laminated layer 7 in the form of alternately laminated films of CoB and Pd was formed. CoB was first formed into a film of 0.3 nm and, thereon, Pd was formed into a film of 0.9 nm. Accordingly, the total thickness of the laminated layer 6 was 1.2 nm. The laminated layer 7 was formed at a gas pressure of 10 mTorr lower than that used when forming the ferromagnetic layer 5.

Then, using a mixed gas containing 18 vol % hydrogen in Ar, a carbon target was sputtered, thereby forming the carbon-based protective layer 8 made of hydrogenated carbon. The thickness of the carbon-based protective layer 8 was 4.5 nm. Since the film hardness is improved in the form of hydrogenated carbon, it is possible to protect the perpendicular magnetic recording layer against an impact from a magnetic head. Thereafter, a lubricating layer 9 made of PFPE (perfluoropolyether) was formed by the dip coating method. The thickness of the lubricating layer 9 was 1 nm.

Through the manufacturing processes described above, the perpendicular magnetic recording disk was obtained. The surface roughness of the obtained perpendicular magnetic recording disk was measured by the AFM in the same manner and it was a smooth surface shape with Rmax being 4.53 nm and Ra being 0.40 nm.

(Evaluation)

Tables 1 and 2 and FIGS. 11, 12, 13, and 14 show the results of various measurements of the surfaces of the glass substrates and the magnetic disks thus obtained.

The measurement conditions and so on are as given at (1) to (3) below.

(1) Duboff is measured using a small-size surface roughness measuring apparatus (SURFTEST SJ-624 manufactured by Mitutoyo Corporation) being a stylus surface roughness meter. A measurement object is a glass substrate (before film formation).

(2) "Microwaviness MW-Rq" is measured using a laser Doppler vibrometer (Optical Process Certifier M4224) manufactured by THoT Technologies, Inc.

Measurement regions are two places, i.e. an outer peripheral end portion (OD: fixed-point observation at a position of radius r=31.5 (±0.05)mm) and a central portion (MD: 1 to 2 mm square regional observation at a position of radius r=25±3 mm) in the radial direction, and the average value and the standard deviation of data measured continuously along the circumferential direction at the same radius are derived with respect to each of the measurement regions (see FIG. 1).

A wavelength band is set to 60 to 500 μm.

A measurement object is a glass substrate (before film formation).

Herein, the measurement conditions of the laser Doppler vibrometer manufactured by THoT Technologies, Inc. are shown in Table 3. For example, short wavelength 100 μm and long wavelength 500 μm represent that the measurement is performed in a wavelength band or bandpass of 100 to 500 μm.

(3) The touch-down height (TDH) is examined by a touch-down height evaluation method.

A measurement object is a magnetic disk (after film formation).

In the case of each of the magnetic disks obtained in Examples, the difference (MW-Rq (OD-MD)) between microwavinesses in the radial direction was 0.02 nm or less (0.2 Å or less) and the ratio (MW-Rq (OD/MD)) between microwavinesses in the radial direction was 1.1 or less. As a result, the touch-down height (TDH) became 5 nm or less and thus it was applicable as a magnetic disk of 160 G or more.

In the case of each of the magnetic disks obtained in Comparative Examples, the difference (MW-Rq (OD-MD)) between microwavinesses in the radial direction exceeded 0.02 nm (0.2 Å) and the ratio (MW-Rq (OD/MD)) between microwavinesses in the radial direction exceeded 1.1. As a result, the touch-down height (TDH) exceeded 5 nm and thus it was only applicable as a magnetic disk up to 80 G.

In the case of each of the magnetic disks obtained in Examples, the difference (MW-Rq STDEV (OD-MD)) between standard deviations of microwavinesses in the circumferential direction was 0.04 nm or less (0.4 Å or less) and the ratio (MW-Rq STDEV (OD/MD)) between standard deviations of microwavinesses in the circumferential direction was 1.1 or less. As a result, the touch-down height (TDH) became 5 nm or less and thus it was applicable as a magnetic disk of 160 G or more.

In the case of each of the magnetic disks obtained in Comparative Examples, the difference (MW-Rq STDEV (OD-MD)) between standard deviations of microwavinesses in the circumferential direction exceeded 0.04 nm (0.4 Å) and the ratio (MW-Rq STDEV (OD/MD)) between standard deviations of microwavinesses in the circumferential direction exceeded 1.1. As a result, the touch-down height (TDH) exceeded 5 nm and thus it was only applicable as a magnetic disk up to 80 G.

TABLE 1

|  |  | Duboff (nm) | MW-Rq (Å) | Microwaviness Index of this Invention (MW-Rq) OD-MD (Å) | OD/MD (—) | TDH (nm) | Judgment |
|---|---|---|---|---|---|---|---|
| Example | 1 | 10 | 1.50 | 0.178 | 1.08 | 4.82 | ○ |
|  | 2 | 11 | 1.43 | 0.137 | 1.05 | 4.55 | ○ |
|  | 3 | 12 | 1.38 | 0.161 | 1.07 | 4.63 | ○ |
|  | 4 | 13 | 1.44 | 0.166 | 1.08 | 4.67 | ○ |
|  | 5 | 15 | 1.64 | 0.114 | 1.05 | 4.34 | ○ |
| Comparative | 1 | 11 | 1.38 | 0.335 | 1.17 | 5.83 | X |
| Example | 2 | 11 | 1.52 | 0.309 | 1.14 | 5.63 | X |
|  | 3 | 13 | 1.51 | 0.288 | 1.14 | 5.46 | X |
|  | 4 | 14 | 1.62 | 0.323 | 1.19 | 5.53 | X |
|  | 5 | 15 | 1.57 | 0.274 | 1.13 | 5.44 | X |

○: TDH ≦ 5 nm
X: TDH > 5 nm

TABLE 2

|  |  | Duboff (nm) | MW-Rq (Å) | Microwaviness Index of this Invention (MW-Rq STDEV) OD-MD (Å) | OD/MD (—) | TDH (nm) | Judgment |
|---|---|---|---|---|---|---|---|
| Example | 1 | 10 | 1.50 | 0.031 | 1.09 | 4.82 | ○ |
|  | 2 | 11 | 1.43 | 0.027 | 1.05 | 4.55 | ○ |
|  | 3 | 12 | 1.38 | 0.030 | 1.06 | 4.63 | ○ |
|  | 4 | 13 | 1.44 | 0.031 | 1.07 | 4.67 | ○ |
|  | 5 | 15 | 1.64 | 0.019 | 1.05 | 4.34 | ○ |
| Comparative | 1 | 11 | 1.38 | 0.068 | 1.18 | 5.83 | X |
| Example | 2 | 11 | 1.52 | 0.059 | 1.16 | 5.63 | X |
|  | 3 | 13 | 1.51 | 0.051 | 1.14 | 5.46 | X |
|  | 4 | 14 | 1.62 | 0.057 | 1.16 | 5.53 | X |
|  | 5 | 15 | 1.57 | 0.051 | 1.15 | 5.44 | X |

○: TDH ≦ 5 nm
X: TDH > 5 nm

TABLE 3

|  | Short Wavelength (μm) | Long Wavelength (μm) | Radius (mm) | Spindle Speed (rpm) | Laser Range |
|---|---|---|---|---|---|
| Micro Waviness | 100 | 500 | 15-31.5 | 5050 | 5 |
| Nano Waviness | 60 | 160 | 15-31.5 | 4650 | 5 |

While this invention has been described with reference to the embodiment, the technical scope of this invention is not limited to the scope of the description of the above-mentioned embodiment. It is obvious to a person skilled in the art that various changes or improvements can be added to the above-mentioned embodiment. It is clear from the description of claims that the modes added with such changes or improvements can also be included in the technical scope of this invention.

The invention claimed is:

1. A glass substrate for a magnetic disk, wherein the glass substrate is configured such that, in regions with respect to two places arbitrarily selected on a surface of the glass substrate on a central portion side relative to an outer peripheral end, a surface shape with a shape wavelength in a band of 60 to 500 μm is extracted from surface shapes in each of the regions and, assuming that a root mean square of the surface shape is given as a microwaviness (MW-Rq), a difference between the microwavinesses (MW-Rq) of the regions is 0.02 nm or less,
    wherein the two places are an outer peripheral end portion of the disk and a central portion of a recording/reproducing area of the disk,
    wherein the outer peripheral end portion of the disk is a region falling within a predetermined distance inward and outward from a point located 1.0 mm inward from an outer peripheral end of the disk toward a center of the disk,
    wherein the microwaviness (MW-Rq) of the outer peripheral end portion is greater than the microwaviness (MW-Rq) of the central portion of the recording/reproducing area,
    wherein an outer peripheral end portion shape of the glass substrate is a shape falling within a range of ±30 nm with respect to a main surface as a reference plane, and
    wherein the microwaviness (MW-Rq) is measured using a laser Doppler vibrometer.

2. A glass substrate for a magnetic disk, wherein the glass substrate is configured such that, in regions with respect to two places arbitrarily selected on a surface of the glass substrate on a central portion side relative to an outer peripheral end, a surface shape with a shape wavelength in a band of 60 to 500 μm is extracted from surface shapes in each of the regions and, assuming that a root mean square of the surface shape is given as a microwaviness (MW-Rq), a ratio between the microwavinesses (MW-Rq) of the regions is 1.1 or less;
    wherein the two places are an outer peripheral end portion of the disk and a central portion of a recording/reproducing area of the disk,
    wherein the outer peripheral end portion of the disk is a region falling within a predetermined distance inward and outward from a point located 1.0 mm inward from an outer peripheral end of the disk toward a center of the disk,
    wherein the microwaviness (MW-Rq) of the outer peripheral end portion is greater than the microwaviness (MW-Rq) of the central portion of the recording/reproducing area, wherein an outer peripheral end portion shape of the glass substrate is a shape falling within a range of ±30 nm with respect to a main surface as a reference plane, and wherein the microwaviness (MW-Rq) is measured using a laser Doppler vibrometer.

3. A glass substrate for a magnetic disk according to claim 1 or 2, wherein the regions are two regions each extending along a circumferential direction at the same radius with respect to the two places selected.

4. A glass substrate for a magnetic disk according to claim 1 or 2, wherein a touch-down height is 5 nm or less.

5. A glass substrate for a magnetic disk according to claim 1 or 2, wherein the magnetic disk is a magnetic disk for a load/unload system.

6. A magnetic disk having at least a magnetic layer formed over a surface of a glass substrate for a magnetic disk according to claim 1 or 2.

7. A magnetic disk manufacturing method, comprising the steps of:
producing a glass substrate for a magnetic disk according to claim 1 or 2, and
forming at least a magnetic layer over a surface of the glass substrate for the magnetic disk.

8. A glass substrate for a magnetic disk, wherein the glass substrate is configured such that, in regions with respect to two places arbitrarily selected on a surface of the glass substrate on a central portion side relative to an outer peripheral end, a surface shape with a shape wavelength in a band of 60 to 500 μm is extracted from surface shapes in each of the regions and, assuming that a root mean square of the surface shape is given as a microwaviness (MW-Rq), a difference between standard deviations of the microwavinesses (MW-Rq) of the regions is 0.04 nm or less,
wherein the two places are an outer peripheral end portion of the disk and a central portion of a recording/reproducing area of the disk,
wherein the outer peripheral end portion of the disk is a region falling within a predetermined distance inward and outward from a point located 1.0 mm inward from an outer peripheral end of the disk toward a center of the disk,
wherein the microwaviness (MW-Rq) of the outer peripheral end portion is greater than the microwaviness (MW-Rq) of the central portion of the recording/reproducing area,
wherein an outer peripheral end portion shape of the glass substrate is a shape falling within a range of ±30 nm with respect to a main surface as a reference plane, and
wherein the microwaviness (MW-Rq) is measured using a laser Doppler vibrometer.

9. A glass substrate for a magnetic disk, wherein the glass substrate is configured such that, in regions with respect to two places arbitrarily selected on a surface of the glass substrate on a central portion side relative to an outer peripheral end, a surface shape with a shape wavelength in a band of 60 to 500 μm is extracted from surface shapes in each of the regions and, assuming that a root mean square of the surface shape is given as a microwaviness (MW-Rq), a ratio between standard deviations of the microwavinesses (MW-Rq) of the regions is 1.1 or less,
wherein the two places are an outer peripheral end portion of the disk and a central portion of a recording/reproducing area of the disk,
wherein the outer peripheral end portion of the disk is a region falling within a predetermined distance inward and outward from a point located 1.0 mm inward from an outer peripheral end of the disk toward a center of the disk,
wherein the microwaviness (MW-Rq) of the outer peripheral end portion is greater than the microwaviness (MW-Rq) of the central portion of the recording/reproducing area,
wherein an outer peripheral end portion shape of the glass substrate is a shape falling within a range of ±30 nm with respect to a main surface as a reference plane, and
wherein the microwaviness (MW-Rq) is measured using a laser Doppler vibrometer.

10. A glass substrate for a magnetic disk according to claim 8 or 9, wherein the regions are two regions each extending along a circumferential direction at the same radius with respect to the two places selected.

11. A glass substrate for a magnetic disk according to claim 8 or 9, wherein a touch-down height is 5 nm or less.

12. A glass substrate for a magnetic disk according to claim 8 or 9, wherein the magnetic disk is a magnetic disk for a load/unload system.

13. A magnetic disk having at least a magnetic layer formed over a surface of a glass substrate for a magnetic disk according to claim 8 or 9.

14. A magnetic disk manufacturing method, comprising the steps of:
producing a glass substrate for a magnetic disk according to claim 8 or 9, and
forming at least a magnetic layer over a surface of the glass substrate for the magnetic disk.

15. A glass substrate for a magnetic disk according to claim 1, 2, 8 or 9, wherein the microwaviness (MW-Rq) is measured by an average value and a standard deviation of data measured continuously along a circumferential direction at the same radius and derived with respect to each of the regions.

16. A perpendicular magnetic recording disk, comprising:
at least a perpendicular magnetic recording layer formed over the glass substrate according to claim 1, 2, 8 or 9.

17. A hard disk drive, comprising:
at least a magnetic disk according to claim 1, 2, 8 or 9, and
a magnetic head.

18. A glass substrate for a magnetic disk according to claim 1, 2, 8 or 9,
wherein the predetermined distance inward and outward from the point located 1.0 mm is 0.05 mm.

* * * * *